April 19, 1932. H. C. COLE 1,854,781
PRESSURE GAUGE
Filed July 7, 1931
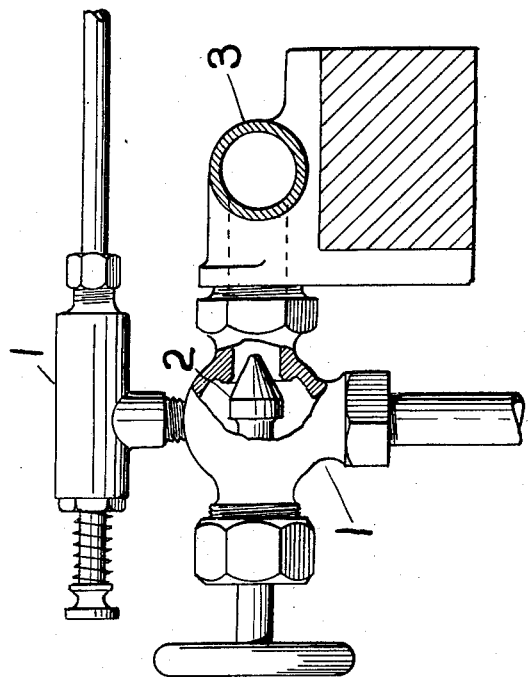
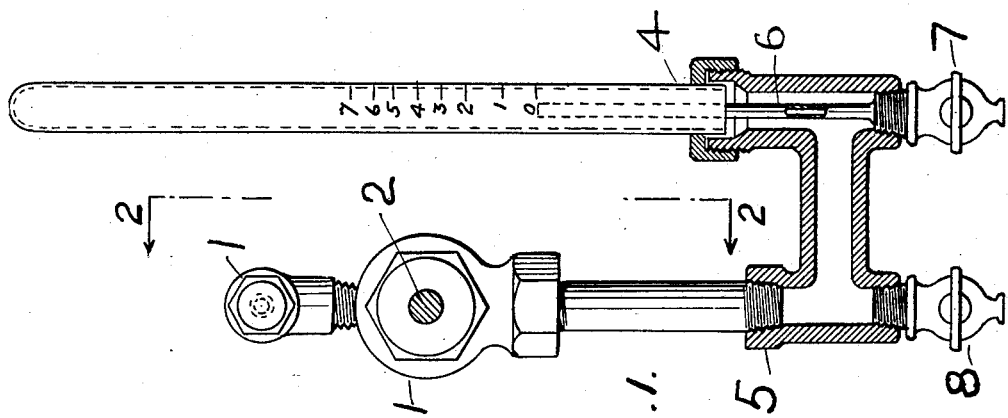
INVENTOR
Harry C. Cole
BY
Augustus B. Stoughton
ATTORNEY.
WITNESS:

UNITED STATES PATENT OFFICE

HARRY C. COLE, OF PHILADELPHIA, PENNSYLVANIA

PRESSURE GAUGE

Application filed July 7, 1931. Serial No. 549,131.

The principal object of the present invention is to provide for conveniently and accurately adjusting a pressure gauge to substantially the true values of the divisions of its graduated scale. This is done, according to the present invention, by trapping in the gauge a definite and appropriate volume of air at atmospheric pressure and at room temperature.

The invention comprises the improvements to be presently described and finally claimed.

In the following description reference will be made to the accompanying drawings forming part hereof, and in which—

Figure 1 is an elevational view partly in section, and

Fig. 2 is a sectional view taken generally on the line 2—2 of Fig. 1.

In general, 1 indicates a liquid system of which the details are not important except that there is a valve 2 for admitting and excluding liquid from the source of supply 3 to the system 1. There is a U-tube of which one leg 4 is provided with a graduated scale and it is sealed and contains an air column adapted to be trapped by liquid in the lower portion of the U-tube and in the other leg 5 thereof and in the system. The U-tube is provided with a valved duct 6 extending from the level of the zero graduation and from the interior of the leg 4 to the outside of the gauge. The valve is shown at 7. 8 is a pet cock for draining the gauge and system.

In order for the gauge to be accurate the quantity of air trapped in the leg 4 must be appropriate. However, in use this condition does not obtain because frequently additional air is added, for example, from the water in the system and gauge. To correct such defect and trap an appropriate volume of air at atmospheric pressure and at room temperature, the valve 2 is closed and the valves 7 and 8 are opened, thus the system is drained and is filled with atmospheric air at room temperature and pressure. Then the valve 8 is closed and the valve 2 opened and water fills the system and rises in the leg 4, and after water starts to run through the duct 6, the valve 7 is closed. Thus there is trapped in the upper part of the leg 4 substantially the requisite quantity of air at atmospheric pressure and room temperature for adjusting the gauge to substantially the true values of the divisions of its graduated scale. The leg 4 is made of glass.

It will be obvious to those skilled in the art to which the invention relates that modifications may be made in details of construction and arrangement and matters of mere form without departing from the spirit of the invention which is not limited to such matters or otherwise than the prior art and the appended claim may require.

I claim:

In a pressure gauge for liquid systems the combination of a U-tube of which one leg is provided with a graduated scale and is sealed and contains an air column adapted to be trapped by liquid in the lower portion of the U-tube and in the other leg thereof and in the system, a valved duct extending from the level of the zero graduation and from the interior of the first mentioned leg to the outside of the gauge, means for draining the gauge and system, and means for excluding liquid from and admitting it to the system.

HARRY C. COLE.